J. H. SHARP.
GAME.
APPLICATION FILED MAY 4, 1917.
1,264,984.
Patented May 7, 1918.
2 SHEETS—SHEET 1.
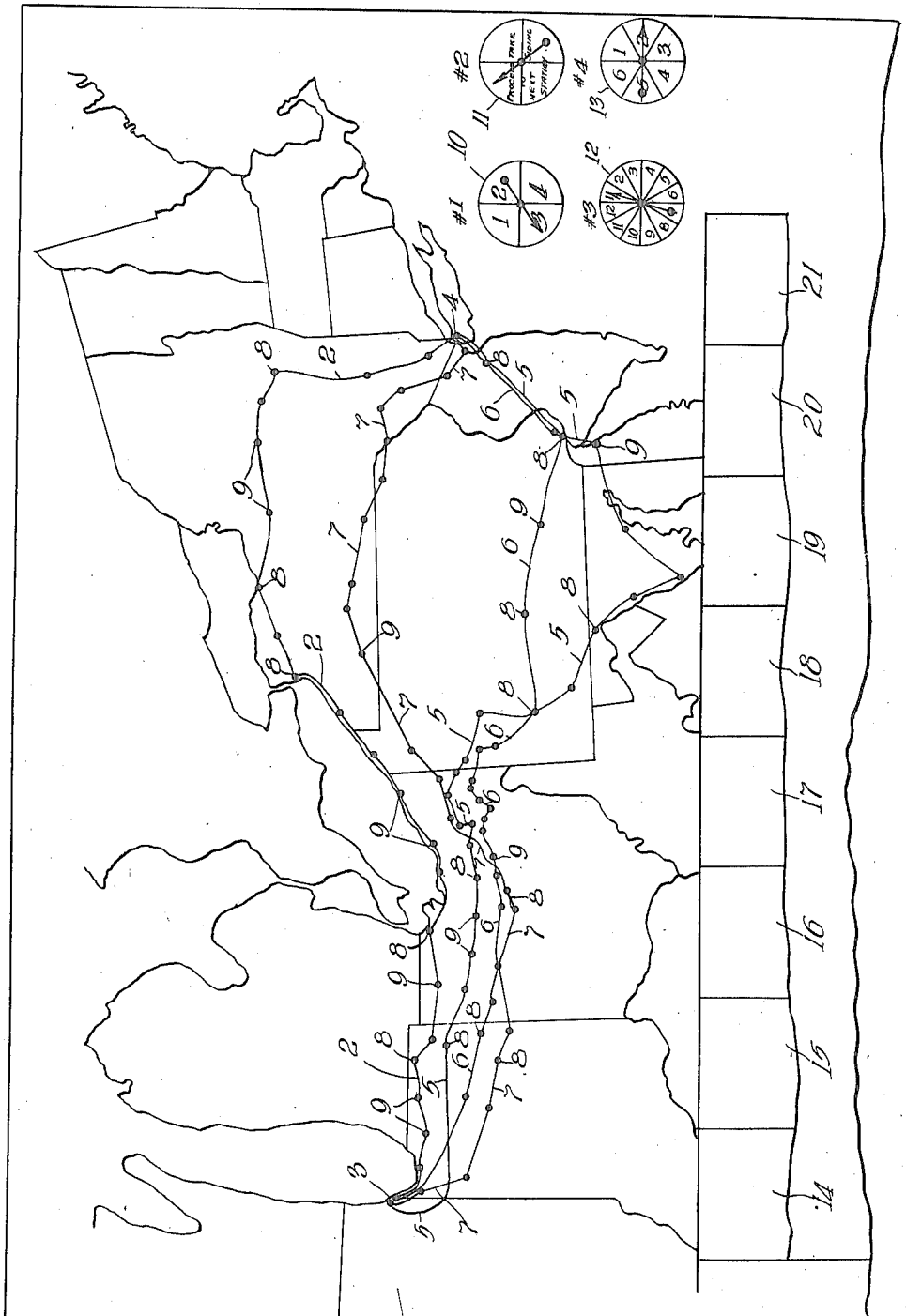

J. H. SHARP.
GAME.
APPLICATION FILED MAY 4, 1917.

1,264,984.

Patented May 7, 1918.
2 SHEETS—SHEET 2.

Fig. 5.
NUMBER TWO WHEEL TRAIN ORDERS
WHEN THE #1 TRAIN POINTS TO
TAKE SIDING STOP BETWEEN
STATIONS, IN 1 TOWN, AND THEN
PROCEED TO THE NEXT STAT-

Fig. 9.
WHEEL NUMBER FOUR
1 NO CONSEQUENCES EXCEPT OP-
ERATING DELAY AND ADDIT-
IONAL OPERATING EXPENSE
2 RAN INTO A PASSENGER

Fig. 4.
NUMBER ONE WHEEL-TRAINS
1 PASSENGER TRAIN $36,000.00
1-LOCOMOTIVE 19,200.00
1-MAIL CAR 14,000.00
1-BAGGAGE CAR

Fig. 8.
12 (CONTINUED)
STARTED. THEY TRY INEFFECT-
IVELY TO PUT OUT THE FLAMES
AND REALIZING THE DAMAGE
THEY HAVE DONE, SCURRY OFF

Fig. 3.
YOU HAVE OPERATED #1 TRAIN FROM
CHICAGO TO NEW YORK AND BACK,
AND YOU HAVE SEEN ALL THE
THINGS THAT CAN HAPPEN TO IT

Fig. 7.
7 (CONTINUED)
A RESULT YOUR TRAIN IS HELD UP
FOR FOUR HOURS NECESSITAT-
ING SENDING OUT ANOTHER
CREW TO PICK IT UP AS THE LIM-

Fig. 2.
INSTRUCTION AND SCORE CARD
PLACE A SHEET OF WHITE PAPER UN-
DER THE HEADING SCORE CARD SO
THAT THE COLUMNS CREDIT, CHARGE,
ETC., WILL BE KEPT IN PROPER ALI

Fig. 6.
WHEEL NUMBER THREE
1 HOT BOX DEVELOPES BECAUSE
SOME BOYS HAVE ROBBED AN
OIL BOX OF THE WASTE TO MAKE
TORCHES. THE HOT BOX COSTS RAD

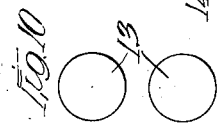

Witnesses.
Harry W. L. White
W. P. Kilroy

Inventor
John H. Sharp
By Thie & Thie Attys.

UNITED STATES PATENT OFFICE.

JOHN H. SHARP, OF CHICAGO, ILLINOIS.

GAME.

1,264,984.

Specification of Letters Patent.

Patented May 7, 1918.

Application filed May 4, 1917. Serial No. 166,358.

*To all whom it may concern:*

Be it known that I, JOHN H. SHARP, a citizen of the United States, residing at Chicago, in the county of Cook and State of Illinois, have invented certain new and useful Improvements in Games, of which the following is a description.

My invention belongs to that general class of devices known as games, and relates particularly to a railroad or transportation game that will be educational as well as entertaining. The game has among its objects the production of an educational device that will acquaint the players with the cost of railroad operation, cost of railroad rolling stock, track, buildings, and expense occasioned by wrecks, accidents, storms, etc., together with the revenue derived from train operation, actual cost to the shippers for transportation of various articles, and revenue derived from passenger traffic, etc. It has as a further object the education of the players on the subject of history, geography, and the various products produced along the various rights of way, values of the same, population, scenery, etc. Various other objects and advantages of the game described herein will be obvious to those skilled in the art from the disclosure herein made.

To this end my invention consists in the novel construction, arrangement and combination of parts herein shown and more particularly pointed out in the claims.

In the drawings, wherein like reference characters indicate like or corresponding parts, Figure 1 is a view of the game board, upon which is shown a map, together with a series of charts and indicators;

Figs. 2 to 9 inclusive are enlarged views of the charts shown on Fig. 1, and

Fig. 10 is a view in elevation of a plurality of forms adapted to represent trains or players.

Referring to the drawings, 1 represents the game board, upon which may be depicted a map or the like, setting forth one or more lines of transportation, as for example a plurality of railroads connecting two different points.

For the purpose of illustrating the game, I have shown a map comprising the territory between New York and Chicago, with four railroads connecting the two cities. As shown, the two cities 3 and 4 respectively are connected by the railroads 2, 5, 6 and 7, extending by different routes, and passing through the several States at different points. I have also indicated thereon cities or towns, as shown at 8 and 9. The cities 8 are intended to represent division points or points where ordinarily engines are changed and inspections made, etc. The cities 9 represent intermediate points, and any number may be represented, their names being preferably given.

On the board, or used in conjunction therewith, I provide a plurality of dials 10, 11, 12 and 13, these being provided with indicators or pointers that spin, the dials being identified in any desired manner, as shown by the numerals 1 to 4 inclusive. Dial or selector No. 1 indicated by the reference character 10, is divided into a plurality of segments, each suitably identified to identify or select the particular kind of train that is to be operated by the player, as for example a passenger train, a freight train, tank car train, stock train, etc. The number of divisions would depend upon the number of kinds of trains provided in the charts hereafter described. Dial or selector No. 2, indicated by reference character 11, is divided into divisions or segments of the desired number, for showing or selecting various train orders that might be given, as for example, proceed to next station or take a siding. In addition they might contain other orders, as for example, return to last station or pass over the tracks of some other railroad, etc.

Dial or selector No. 3, indicated by character 12, is divided into the desired number of divisions, each suitably identified and referring to a chart showing things such as accidents, or the like, storms, and other conditions that might happen between stations, and without any fault of the railroad company (player) and unforeseen by the company.

Dial or selector No. 4, indicated by 13, is divided into the desired number of divisions, each suitably identified for reference to one of the charts, indicating possible happenings, possible through the negligence of employees (player) of the railroad company, as for example, failure of service, such as inspection or the giving or obeying of signals, etc.

The charts 14–21 inclusive shown in Figs. 2 to 9, respectively, set forth the rules of the game, instructions and the happenings as indicated or selected by the various dials, or their equivalents for the purpose. For instance the instructions and score card 14 might be substantially as follows:

*Instruction and score card.*

Place a sheet of white paper under the heading "Score card" so that the column credit, charge, etc., will be kept in proper alinement.

*Rule one.*

Spin arrow marked number one. This shows kind of train you are to run. Charge in the charge column the cost of this train as shown by the table under heading "Wheel number one."

*Rule two.*

Spin wheel number two for train orders and proceed to the next station as is shown by these orders, if they indicate "Take a siding" come to a full stop at some point between the stations, otherwise make the move between stations continuous. In either event the move between stations counts only one turn.

*Rule three.*

After spinning number two wheel for train orders, spin number three wheel to ascertain what happened between stations. If the arrow points to a clear space nothing happened, if it points to one of the numbered spaces, consult that number under wheel number three and charge to the charge column the amount shown.

*Rule four.*

In the event that you by mistake fail to come to a stop when ordered to take a siding, or that you come to a stop when not ordered to do so, spin wheel number four and charge yourself with the damage as shown.

*Rule five.*

Each time you reach a station marked with a cross you are charged with $172.00 in the charge column. This is because you had to change engines and you are charged with $85.00 wear and tear on the engine, $27.00 for coal, $6.00 for water (which has to be treated and pumped) and $54.00 for inspection, train despatching, signal maintenance, etc. Total of $172.00.

*Rule six.*

At the end of a run you are charged with $298.00 for track maintenance, car inspection, wear and tear on the cars, office expense, station help, light and heat.

*Rule seven.*

The object of this game is to operate a train for the least money for a round trip between the two terminals, and the one with the lowest score is the winner.

*Rule eight.*

In the event that you wreck your train or destroy it in any way, spin number one wheel, charge yourself with the new train and proceed from the station which you left just before the accident.

*Rule nine.*

When you have returned your train to a starting point, you are credited with the amount you paid for it in the first place, and the difference between the charge and credit columns is the amount used in scoring.

*Score card.*

Charge. Credit.   Charge. Credit.   Charge. Credit.

Chart 15 might be substantially as follows:

*Number one wheel—Trains.*

1. Passenger train—
| | |
|---|---:|
| 1—Locomotive | $36,000.00 |
| 1—Mail car | 19,500.00 |
| 1—Baggage car | 14,000.00 |
| 2—Day coaches | 22,000.00 |
| 3—Pullmans | 48,000.00 |
| 1—Dining car | 21,000.00 |
| | $160,000.00 |

2. Freight train—
| | |
|---|---:|
| 1—Locomotive | $31,000.00 |
| 1—Caboose | 2,100.00 |
| 62—Box cars ($1250 ea.) | 77,500.00 |
| Value of loads | 231,000.00 |
| | $341,600.00 |

(Those loads consist of paint, wheat, clothing, dress goods, furniture, canned corn, shoes, etc.)

3. Tank car train—
| | |
|---|---:|
| 1—Locomotive | $31,000.00 |
| 1—Caboose | 2,100.00 |
| 37—Tank cars ($2600 ea.) | 96,200.00 |
| Loads | 51,800.00 |
| | $181,100.00 |

(These cars each contain about 7000 gallons of gasolene.)

4. Stock train—
| | |
|---|---:|
| 1—Locomotive | $31,000.00 |
| 1—Caboose | 2,100.00 |
| 40—Cars ($900 ea.) | 36,000.00 |
| Loads | 108,000.00 |
| | $177,100.00 |

(Each car contains thirty cattle with an average value of $90.00 ea.)

Stop the train twice between each station to feed and water stock.

Chart 17:—

*Number two wheel—Train orders.*

When the arrow points to "take siding" stop between stations in moving, and then proceed to the next station. Both these moves are counted as one turn.

When the arrow points to "Proceed to the next station" the move is made without any halt at all and also constitutes one move.

If a player fails to stop when ordered to take a siding he then spins number four wheel, and where the arrow stops indicates what, if any, accident occurred on account of his failure to obey orders.

Chart 18:—

*Wheel number three.*

1. Hot box develops because some boys have robbed an oil box of the waste to make torches. The hot box costs $10.00 to fix up, and the delay to the train has occasioned $75.00 worth of extra train despatching, has held up four other trains, and this costs in loss of time $178.00.

Total amount charged $263.00.

2. Just inside the town in the railroad yard two boys have been playing with the switch, they broke the lock with a stone and have set the switch against you, they pulled off the flag and you apparently have a clear track. Your train goes into the open switch and is derailed. Fortunately no one is killed, but the engine is damaged and the track torn up. Damage $2250.00. All trains held up because they have to be backed out and sent on over another railroad track. Cost $560.00.

Total amount charged $2810.00.

The preceding charts 16 to 20 set forth the various conditions indicated or selected on dial No. 3. Failure to obey orders call for the spinning of the pointer around dial 4, and the result thereof is indicated on chart 21, as, for example.

*Wheel number four.*

1. No consequences except operating delay and additional operating expense. Damage $62.50.

2. Ran into a passenger train, killed one engineer and one fireman, three passengers injured:

| | Damage. |
|---|---|
| Death claims | $10,000.00 |
| Injured claims | 11,800.00 |
| Legal fees | 1,235.00 |
| Damage to track | 920.00 |
| Damage to train | 624.00 |
| Cost of investigation | 318.00 |
| Delay to service | 154.25 |
| Total damage | $119,051.25 |

3. You ran into a derail fastened to the track so as to prevent your running along at high speed after you forgot your orders, and as a result, your engine and two cars were thrown off the track:

| | Damage. |
|---|---|
| Damage to locomotive | $625.00 |
| Damage to track | 116.25 |
| Damage to cars | 87.50 |
| Labor of wrecking crew | 132.00 |
| Delay to train service | 194.00 |
| Total damage | $1,154.75 |

Chart No. 15 is intended to provide a space for the indication of conditions generally, and cover the operation of railroads, together with the freight rates, and the same may also be arranged to provide for setting forth the total revenue of operating the train of one of the kinds set forth. This chart generally is educational, in that it gives an insight into the railroad operation, and possible revenues to be derived. The same may be elaborated upon to any desired extent. It may also be set forth upon this chart or additional chart, the make-up of various trains, the number of passengers, or kinds and quantity of freight carried. There may also be provided on the chart statistical facts relative to the products of the various cities or communities through which the several railroads pass, the population, scenery, and the like. There are so many possibilities it is impossible to set forth and illustrate all of the features. The game illustrated is particularly intended to show the costs of operating trains between certain terminals or for a round trip, and if desired, the revenue derived from operating the train between desired terminals or for a round trip. In playing the game the trains are represented by a suitable "pawn" or "man" 13 (see Fig. 10), which is moved in accordance with the indications given by the indicators. When the costs are considered, the player operating the train between the points 3 and 4 for the least amount of money is the winner, while where the revenue is considered, the player operating his train for the round trip, or one way, with the greatest amount of revenue, is the winner, or the two combined and the player operating his train with the greatest profit may be the winner. The use of the map, spinners and charts are preferred, but it is obvious that their equivalent may be employed to produce the same educational results.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:—

1. In a game of the kind described and in combination, means for displaying a railroad system, means for selecting the particular kind of train operating on the system, means for indicating the cost of said train selected, means for indicating the movements of the train, means for selecting any one of a plurality of accidents that might happen to the train selected, means for indicating the accident resulting therefrom, means for selecting a penalty for failure to operate the train as directed, and means for indicating the penalty selected.

2. In a game of the kind described and in combination, means for displaying a railroad system, means for representing trains to be operated thereon, means for selecting the particular kind of train operating on the system, means for indicating the cost of said train selected, means for directing the movements of the train, means for selecting any one of a plurality of accidents that might happen to the train selected, means for indicating the accident and loss resulting therefrom, means for selecting a penalty for failure to operate the train as directed, and means for indicating the penalty selected.

3. In a game of the kind described and in combination, means for displaying a plurality of railroad systems, means for representing trains operating on said systems, means for directing the movements of said trains on said systems, means for selecting any one of a plurality of accidents that might happen to said trains, and means for indicating a penalty for the accident selected to the train.

4. In a game of the kind described and in combination, means for displaying a plurality of transportation systems, means for representing vehicles traveling on said systems, means for selecting the particular kind of vehicle operating on the system, means for directing the movement of said vehicles, means for selecting a penalty for failure to operate the vehicles as directed, and means for indicating the penalty selected.

5. In a transportation game of the kind described and in combination, means for displaying diagrammatically a plurality of railroad systems, means for representing trains traveling on said systems, means for selecting the kind of train operating on said systems, means for indicating the cost of said trains selected, means for indicating and directing the movements of said trains, means for selecting any one of a series of accidents that might happen to said trains, means for indicating the particular accident and loss resulting therefrom, means for selecting a penalty for failure to operate any trains as directed, and means for setting forth the penalty selected.

6. In a transportation game of the kind selected and in combination, means for displaying a plurality of railroad systems diagrammatically, means for representing trains operating on said systems, and means for directing the operation of said train representations, and indicating and controlling the operation thereof between common points on said systems.

7. In a transportation game of the kind described and in combination, means for diagrammatically displaying a plurality of railroad systems, means representing trains operating on said systems, means for directing the operation of said trains, including means for indicating the results of improper operation, including accidents, and the cost of said improper operations and accidents.

In testimony whereof, I have hereunto signed my name in the presence of two subscribing witnesses.

JOHN H. SHARP.

Witnesses:
ROY W. HILL,
CHARLES I. COBB.